(12) United States Patent
Schurb et al.

(10) Patent No.: US 6,487,937 B2
(45) Date of Patent: Dec. 3, 2002

(54) COMPUTER-CONTROLLED BAND SAW SHARPENER

(76) Inventors: Gary E. Schurb, 2108 Hayes St., Eureka, CA (US) 95501; Allen D. Degan, 3240 Winding Way, Redding, CA (US) 96003; Andrew P. Gordon, 2845 North St., Eureka, CA (US) 95501; Richard W. Mayberry, P.O. Box 687, Blue Lake, CA (US) 95501

( * ) Notice: Subject to any disclaimer, the term of this patent is extended or adjusted under 35 U.S.C. 154(b) by 0 days.

(21) Appl. No.: 09/992,179

(22) Filed: Nov. 14, 2001

(65) Prior Publication Data

US 2002/0035893 A1 Mar. 28, 2002

Related U.S. Application Data

(62) Division of application No. 09/539,267, filed on Mar. 30, 2000, now Pat. No. 6,374,703.

(51) Int. Cl.[7] .............................................. B23D 63/12
(52) U.S. Cl. ......................................... 76/40; 409/159
(58) Field of Search ............................... 76/37, 40, 41, 76/43, 50, 45; 409/159

(56) References Cited

U.S. PATENT DOCUMENTS 5,471,897 A * 12/1995 Wright ........................... 76/37
6,227,776 B1 * 5/2001 Kitamura et al. ........... 409/159

* cited by examiner

*Primary Examiner*—Douglas D. Watts
(74) *Attorney, Agent, or Firm*—R. Michael West; Boutin, Dentino, Gibson, DiGiusto, Hodell & West

(57) ABSTRACT

A computer-controlled band saw sharpener employing electrically powered, X and Y axis drivers, each having a reciprocating element. The X-axis driver actuates a feed finger mechanism, to index the saw in repetitive, stepped fashion, while each tooth is successively ground. In concert with the X-axis driver, the Y axis driver repetitively lowers and raises a grinding head, provided with a rotary grinding wheel. Both the X and Y axis drivers include servomotors to rotate the shaft of an elongated ball screw. A carrier box houses a non-rotatable ball screw nut. The nut travels back and forth along the ball screw shaft in accordance with its direction and extent of rotation. Drive arms for the feed finger mechanism and the grinding head mechanism are bolted at their lower ends to a threaded bushing in the nut carrier box. The computerized controller is programmable, to produce virtually any desired tooth shape in the saw. Standard-tooth profiles, variable-pitch tooth profiles, and variable depth tooth profiles may be selected by touching a button on the controller's panel. The apparatus may be used either in new sharpener construction, or as a retrofit to prior art sharpeners to replace mechanical cam-actuated drive mechanisms.

13 Claims, 10 Drawing Sheets

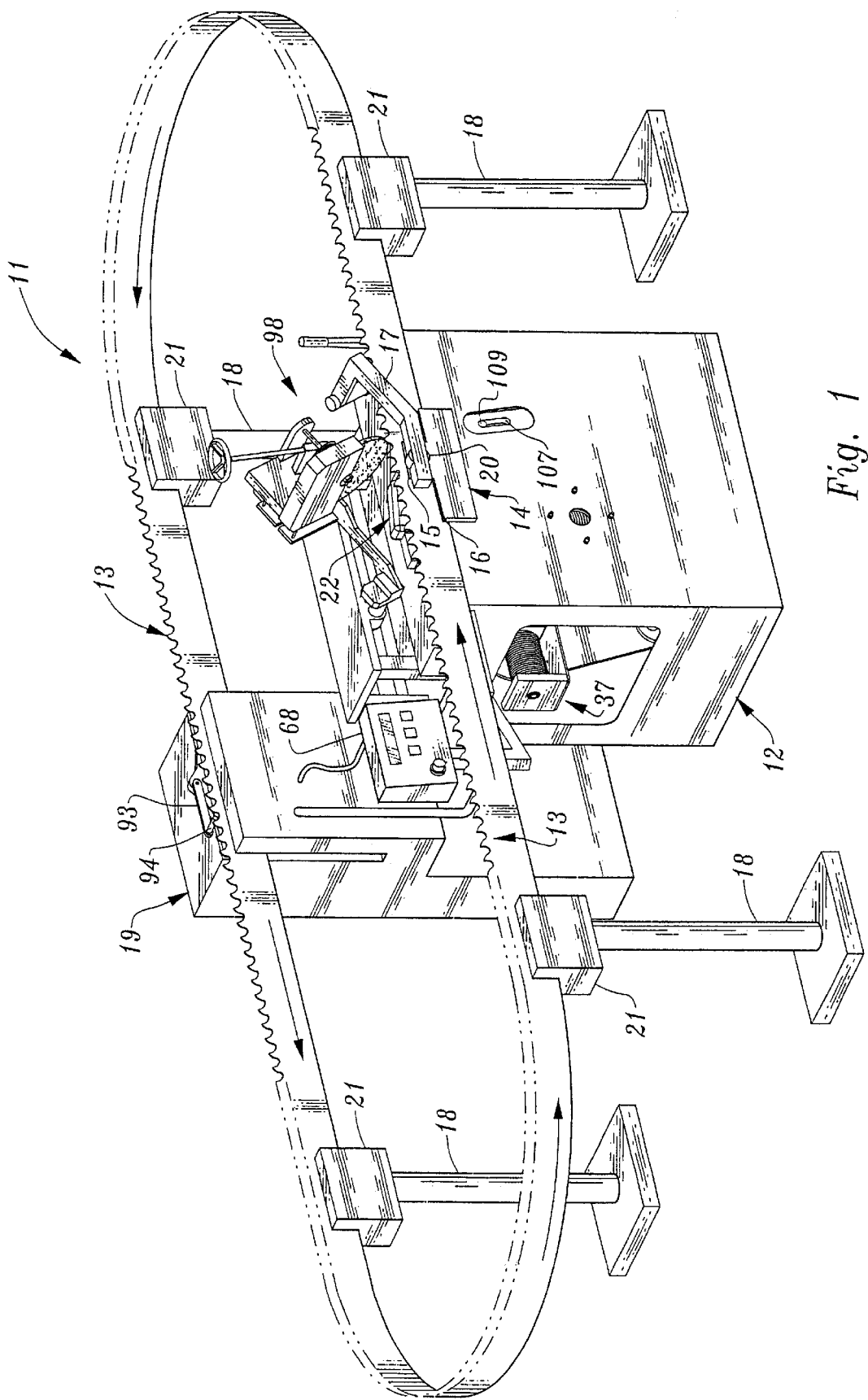

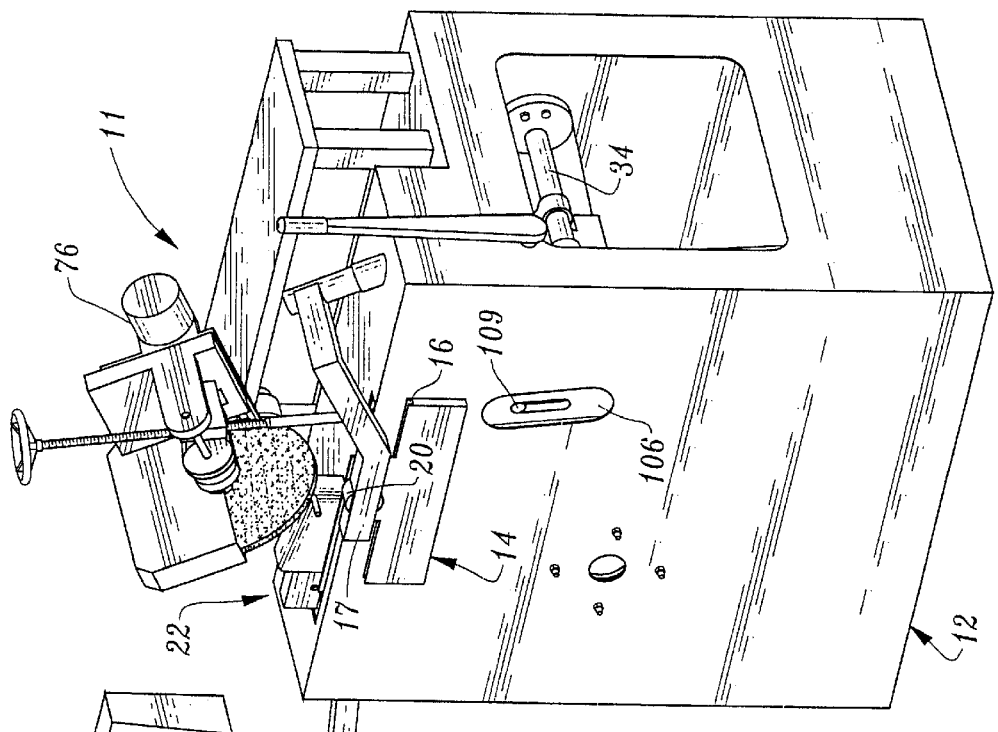
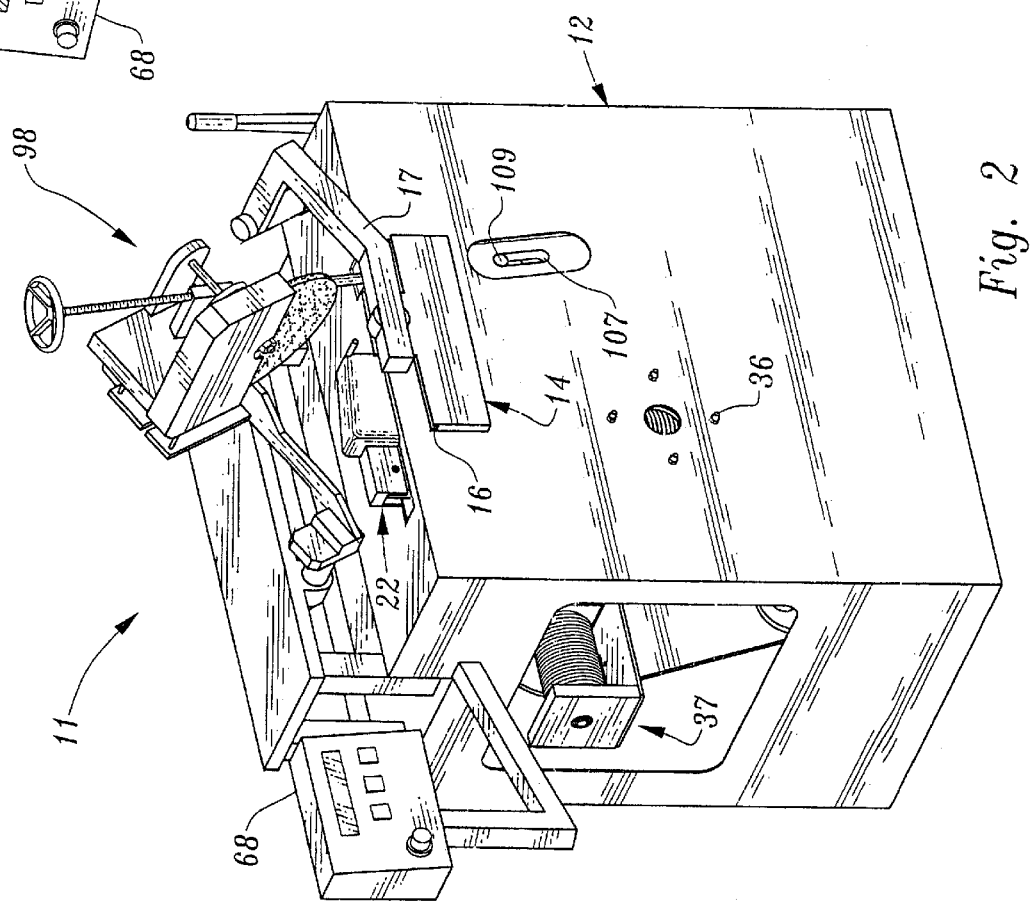

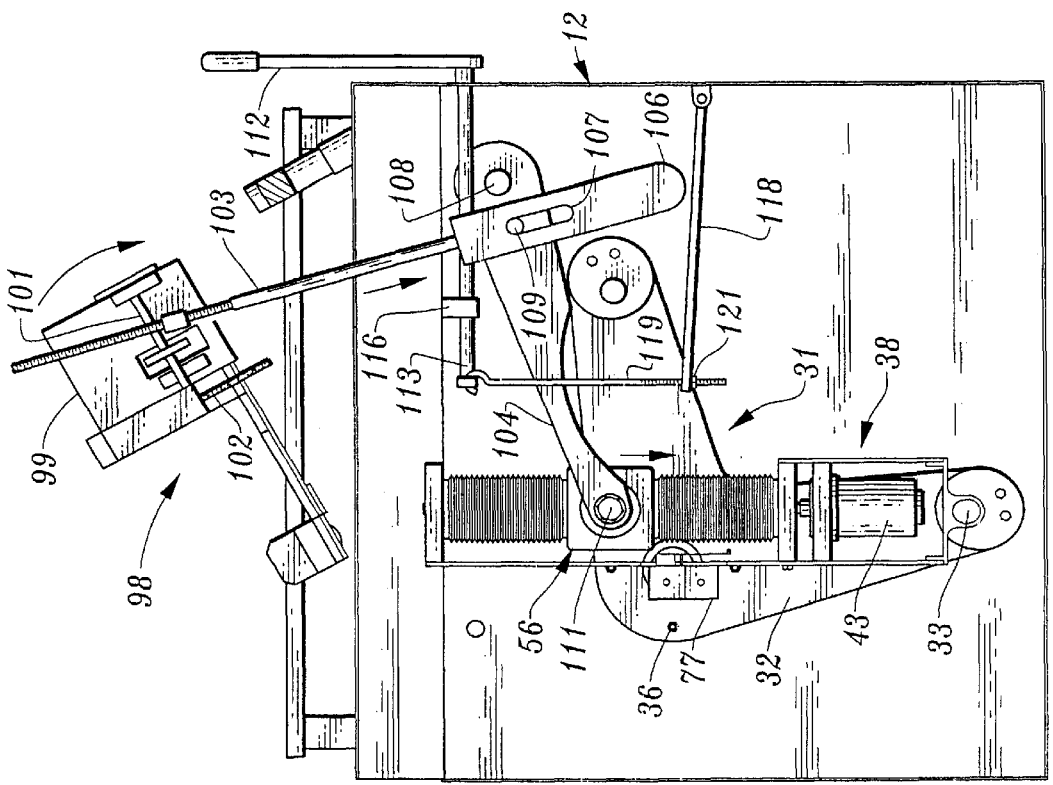
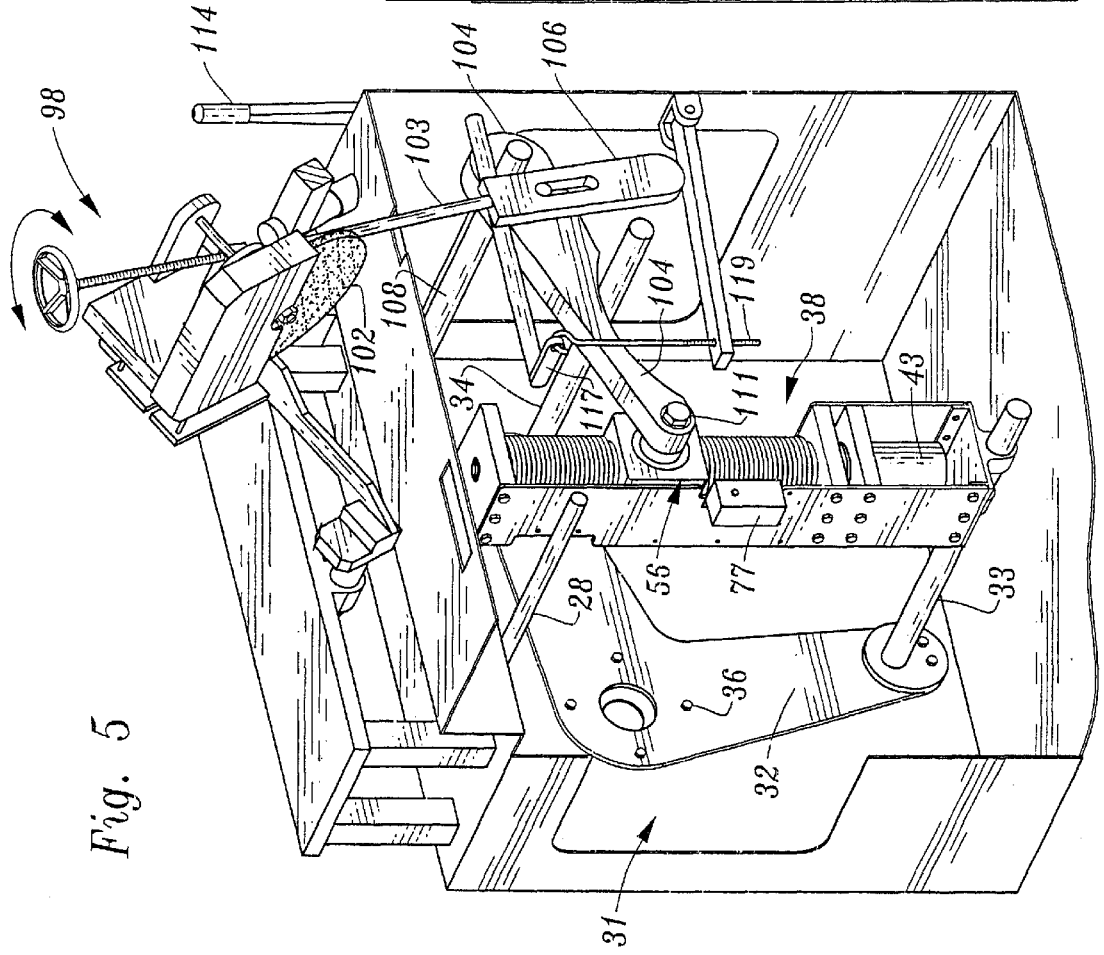

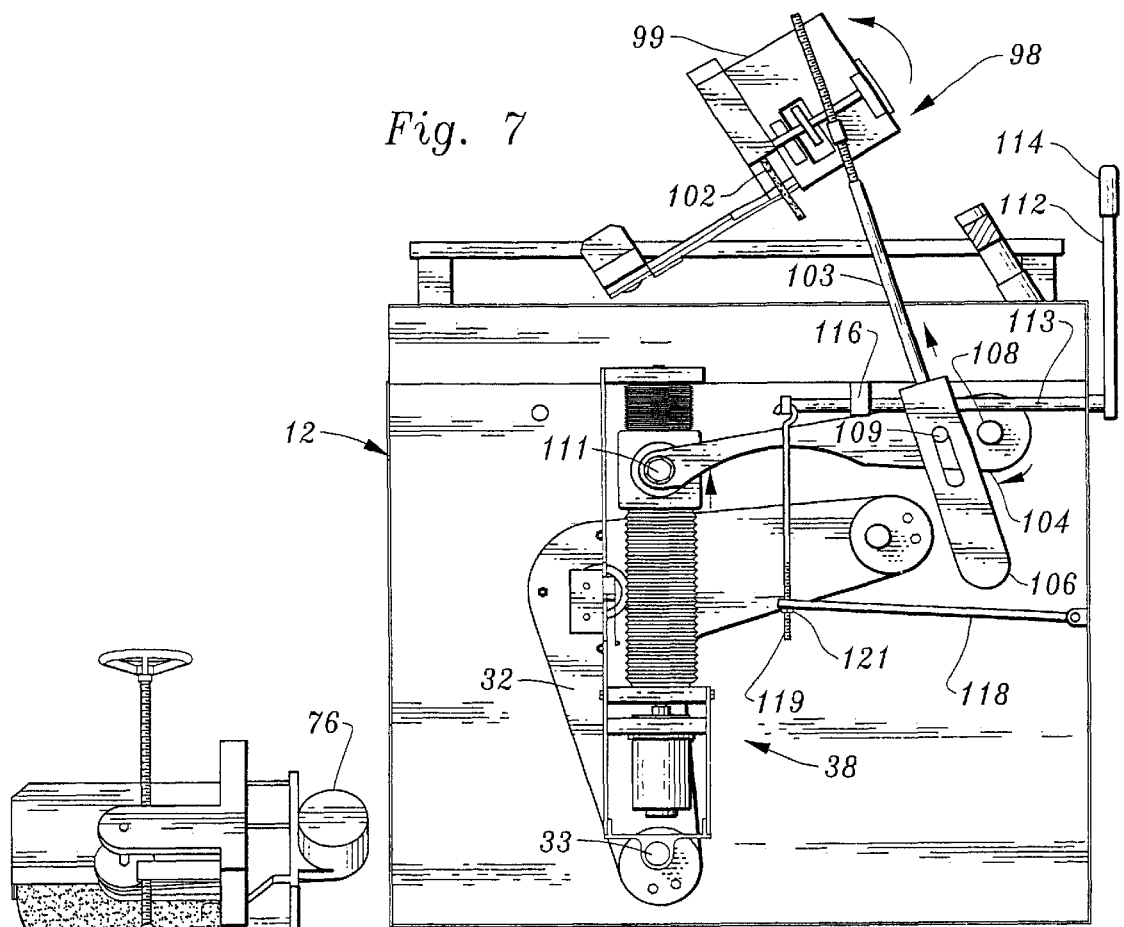
Fig. 7
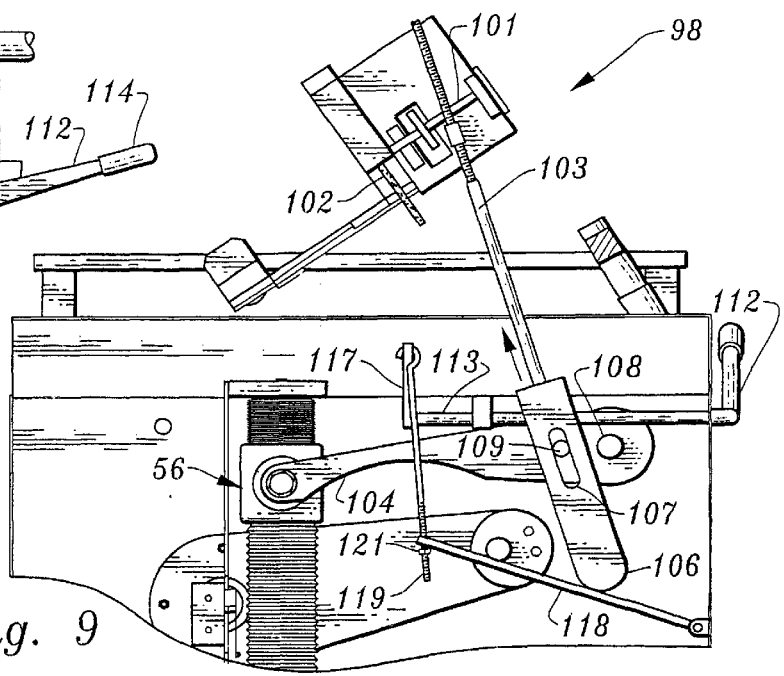
Fig. 8
Fig. 9

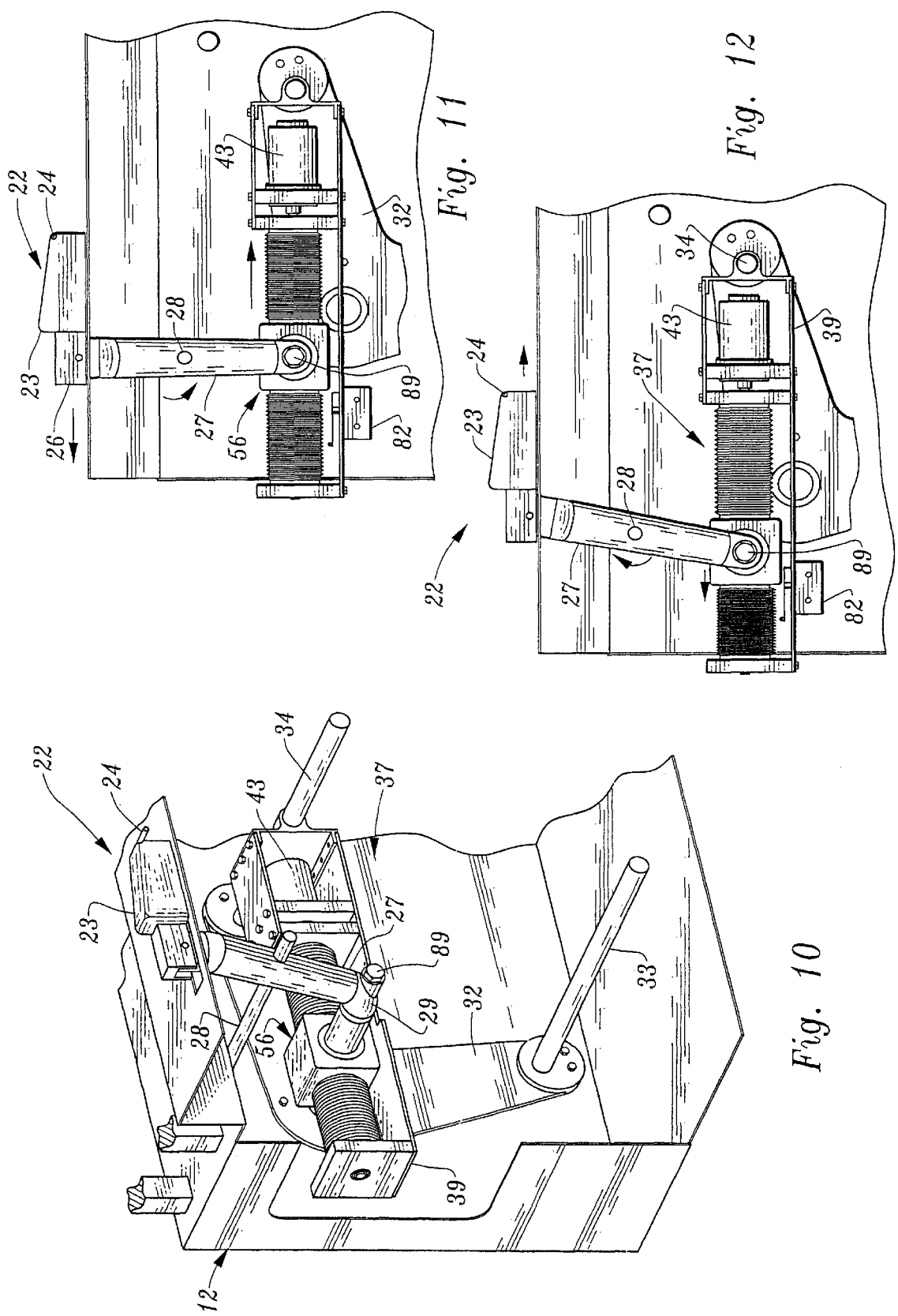

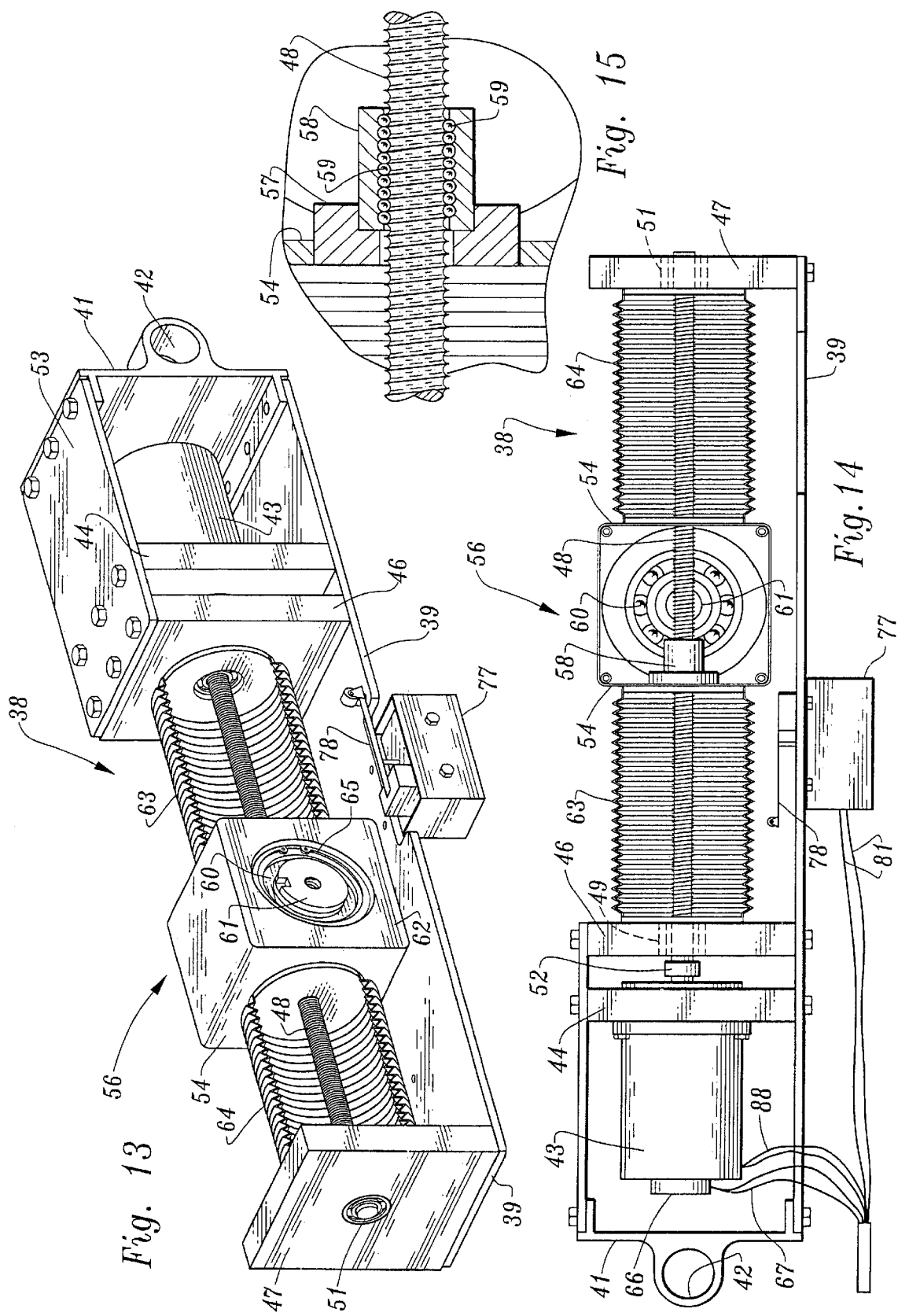

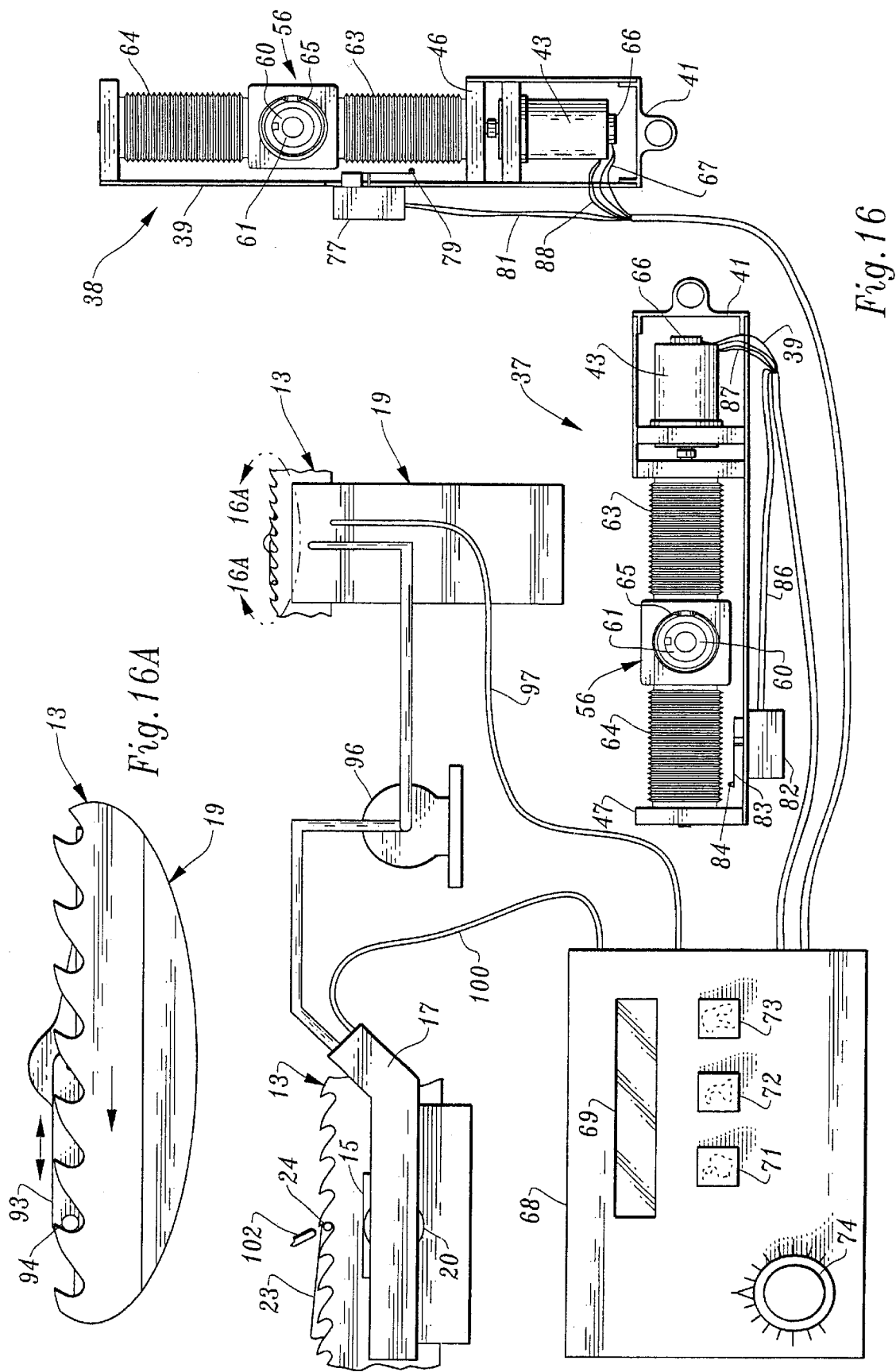

COMPUTER-CONTROLLED BAND SAW SHARPENER

CROSS REFERENCE TO RELATED APPLICATIONS

This application is a division of application Ser. No. 09/539,267 filed on Mar. 30, 2000, now U.S. Pat. No. 6,374,703, issued Apr. 23, 2002.

BACKGROUND OF THE INVENTION

1. Field of the Invention

The invention relates generally to devices for sharpening band saws used in the lumber industry and for sharpening saws used in other industrial and commercial applications. More specifically, the invention pertains to a computer-controlled system, for driving the saw blade advancing and saw blade grinding components of a saw sharpener.

2. Description of the Prior Art

Automatic band saw sharpeners have been available for many years. These sharpeners are used to sharpen large, industrial ban saws, used primarily in the lumber industry. Typically, such sharpeners include a main sharpener frame and a plurality of outboard support posts. These posts maintain the blade in a horizontal, oval-like configuration during the sharpening operation. Prior art sharpeners employ a feed finger mechanism to index the band saw in sequential, stepped fashion through the sharpener, while the grinding wheel of a grinding head assembly is successively lowered into and raised from the blade to shape each tooth.

Cam-actuated mechanism have previously been used to drive both the feed finger and the grinding head in the proper timed relationship. For example, in the prior art band saw sharpener manufactured by the Armstrong Manufacturing Company of Portland, Oreg., an electric motor rotates a drive shaft upon which at least two separate cams are located. A treadle arm, connected to the grinding head assembly, includes a cam follower on its lower end for engagement with one of the cams. In similar fashion, a feed finger arm is connected to the feed finger mechanism, and includes a cam follower on its lower end for engagement with the other cam. Rotating the drive shaft effects X-axis movement of the feed finger and Y-axis movement of the grinding head assembly, so as to grind the desired tooth configuration into the saw.

If single lobe drive cams are used, such a sharpener will produce teeth having the same pitch and the same gullet depth. However, it has been determined that variable tooth patterns in the saw may be desirable, as certain operational advantages are provided. For example: the feed speeds for sawing the subject lumber may be increased; the "washboard" pattern that same pitch and same depth teeth impress in the lumber may be eliminated or reduced; and, the size of the kerf produced in the cut lumber may also be reduced, saving wood product.

To satisfy this need, prior art sharpeners were developed which use drive cams having multiple lobes to produce variable pitch and variable depth gullets. It has also been advocated to provide up to three pairs of such cams on a single drive shaft, so that different pitches and different gullet depths may appropriately be selected for the particular saw to be sharpened. However, it is time consuming to move and relocate the cams and then set up the sharpener so it is adjusted properly for the different grinding operation. Moreover, a considerable investment must be made to acquire and maintain the cams corresponding to each selected pitch and depth.

Another disadvantage of the cam-actuated system is the mechanical wear that results from long-term use of the sharpener. Mechanical wear in drive components, such as the drive cams and the cam followers, can cause improper and erratic grinding patterns, resulting in undesirable tooth size and shape. In addition, replacing the cams is expensive, and results in down time for the sharpener.

In recognition of these disadvantages, efforts have been made to redesign or replace the cam-actuated mechanisms in saw sharpeners. Specifically, a number of patents have issued for more modern saw blade sharpeners, some of which incorporate programmable computers or controllers. Other sharpeners disclosed in recently issued patents employ alternative drive mechanisms for their saw blade driving and grinding head components.

For example, U.S. Pat. No. 5,488,884, issued to Andrianoff et al., shows an apparatus for side-grinding saw blade teeth. This apparatus uses a commercially available programmable controller, and includes pneumatic cylinders to move the grinding head assembly. In U.S. Pat. No. 5,471,897, granted to Wright, a "conventional computer numeric controller" is used to provide sharpening functions. The Wright reference also shows the use of servo motors and ball screw mechanisms, to effect movement of the grinding wheel assembly, in the X and Y axes. And, in U.S. Pat. No. 5,826,465, issued to Iseli, a band saw manufacturing method is disclosed which uses hydraulic rams for advancing and retracting the "grinding wheel arrangement".

Nevertheless, the need exists for an apparatus which may be installed as a retrofit to a prior art cam-actuated sharpener, giving it vastly improved flexibility and performance: and, the need further exists for economical drive and control systems which may be incorporated into new saw sharpeners, which systems provide reliability and accuracy not attainable by known prior art devices.

SUMMARY OF THE INVENTION

The present invention uses a programmable computerized controller, for actuating both an X-axis driver and a Y-axis driver. Each of these drivers employs a rotatable ball screw, a non-rotatable ball screw nut in threaded engagement with the ball screw, a reciprocating carrier box for the screw nut, a servomotor driving one end of the ball screw, an encoder to provide feedback information to the controller regarding the rotational position of the servomotor, and a micro switch positioned to actuate at a predetermined "home" location for the carrier box for the ball screw nut.

If the invention is implemented as a retrofit conversion to a prior art band saw sharpener, the drivers replace an existing motor driven cam mechanism. This mechanism typically includes an electric motor driving a shaft provided with two cams. The cams are engaged by respective cam followers, connected to respective drive arms. One drive arm moves a saw feed mechanism in a horizontal, or X-axis direction, and the other drive arm moves a grinding head mechanism in a vertical, or Y-axis direction. The coordinated horizontal movement of the saw blade and the vertical movement of the grinding head, effect grinding of the desired saw tooth shape in the blade.

To install the present invention as a retrofit conversion, the electric motor for driving the cam shaft, the shaft, the cams, the bearings supporting the shaft, and the cam followers, are all removed. A sub-frame, including parallel shafts strategically located to support each of the new X-axis and Y-axis drivers, is then installed. The sub-frame is conveniently installed to the main frame using the same holes used to secure the just-removed cam shaft bearings. The carrier box of each driver is bolt-connected directly to a foot or an end of the existing drive arms in the same place where the cam followers were previously attached.

The computerized controller is mounted to the sharpener frame, and cables extending therefrom provide electrical interconnections to each of the drivers. The controller appropriately actuates the driver servo motors, which in turn effects rotation of the ball screws, resulting in reciprocating X and Y axis movement of the drive arms. In this manner, the retrofit drivers control the saw blade feed and grinding head components just like the prior art cam-driven mechanisms did.

However, because the computerized controller is programmable, virtually any tooth shape can be produced by the sharpener without changing any of its mechanical components. For example, the controller can effect standard-tooth profiles, variable-pitch tooth profiles, and variable depth tooth profiles. The controller may be switched from one tooth profile to another in seconds, merely by touching a button. The controller has two grinding modes for each tooth profile, a standard grind and a retip grind. In the retip grinding mode, the grinding feed rate is slowed down while the top and the face of the new tip are shaped, and then the normal grinding speed is resumed while shaping the remainder of the tooth profile.

If the invention is implemented as part of a new band saw sharpener construction, substantially the same components are used, except the entire electric motor, shaft, cams, and cam follower components of the prior art device are never used or installed, resulting in substantial savings.

Therefore, it is an object of the present invention to provide a computer-controlled band saw sharpener, which may be implemented either as a retrofit modification to an old sharpener, or as part of a newly constructed sharpener, and which can grind standard-tooth profiles, variable-pitch profiles, and variable depth profiles, without changing any mechanical components.

It is a further object herein to disclose an electronically actuated X-axis driver and a Y-axis driver, each employing a servo motor, a rotatable ball screw, and a non-rotatable ball nut for improved accuracy, flexibility, and control over the operation of a feed finger mechanism and a grinding head assembly in a saw sharpener.

It is yet a further object herein to disclose a computer-controlled driver for use with a sharpener, in which the driver includes a rotatable ball screw driving a ball nut fixed within a movable carrier box, in which the carrier box is supported entirely by the ball nut and captive balls.

It is yet a further object herein to disclose a computerized controller for electronically actuated X and Y axis drivers in a saw sharpener, which controller is programmable to effect a wide variety of different pitch and gullet depths for saw teeth, by a button selection made by the user.

It is yet a further object herein to disclose a lever actuated lifting mechanism, for raising the grinding head assembly of a saw sharpener into a disabled position, above the saw.

These and other objects of the present invention will become apparent by reference to the accompanying text and drawings which follow.

BRIEF DESCRIPTION OF THE DRAWINGS

FIG. 1 is a left front perspective view of a band saw sharpener incorporating the features of the present invention, and further including outboard saw support posts, a back feed unit, and a band saw in position for sharpening;

FIG. 2 is a left front perspective view of the sharpener shown in FIG. 1, taken to an enlarged scale;

FIG. 3 is right front perspective view of the sharpener shown in FIG. 1, taken to an enlarged scale;

FIG. 5 is a perspective view of the sharpener with a portion of the frame being broken away to show the Y-axis driver and its attachment to one of the support shafts of a sub-frame;

FIG. 6 is a side elevational view of the sharpener and the Y-axis driver, with the grinding head assembly in a lowered position;

FIG. 7 is a view as in FIG. 6, but showing the grinding head assembly in a raised position;

FIG. 8 is fragmentary, side elevational view of one end of the sharpener, showing the grinding head assembly lifter arm rotated downwardly;

FIG. 9 is a fragmentary view of the sharpener as in FIG. 6, but showing the lifter arm rotated downwardly, to raise the grinding head assembly into a disabled position;

FIG. 10 is a perspective view of the sharpener with a portion of the frame being broken away to show the X-axis driver and its attachment to the other support shaft of the sub-frame;

FIG. 11 is a fragmentary, side elevational view of the sharpener, showing the rearward motion of the X-axis driver and the saw feed finger mechanism;

FIG. 12 is a view as in FIG. 11, showing the forward motion of the saw feed finger mechanism;

FIG. 13 is a left front perspective of the Y axis driver, a portion of the two bellows being broken away to show the ball screw shaft;

FIG. 14 is a side elevational view of the Y axis driver, a cover plate for the carrier box being removed to show the ball screw nut;

FIG. 15 is a fragmentary, cross-sectional view of the ball screw shaft and ball screw nut;

FIG. 16 is a schematic representation showing the computerized controller, the X and Y axis drivers, the back feed unit, and a pneumatic pump;

FIG. 16A is an inset detail, taken on the line 16A—16A, shown in FIG. 16; and,

DETAILED DESCRIPTION OF THE PREFERRED EMBODIMENT

Figure 4:
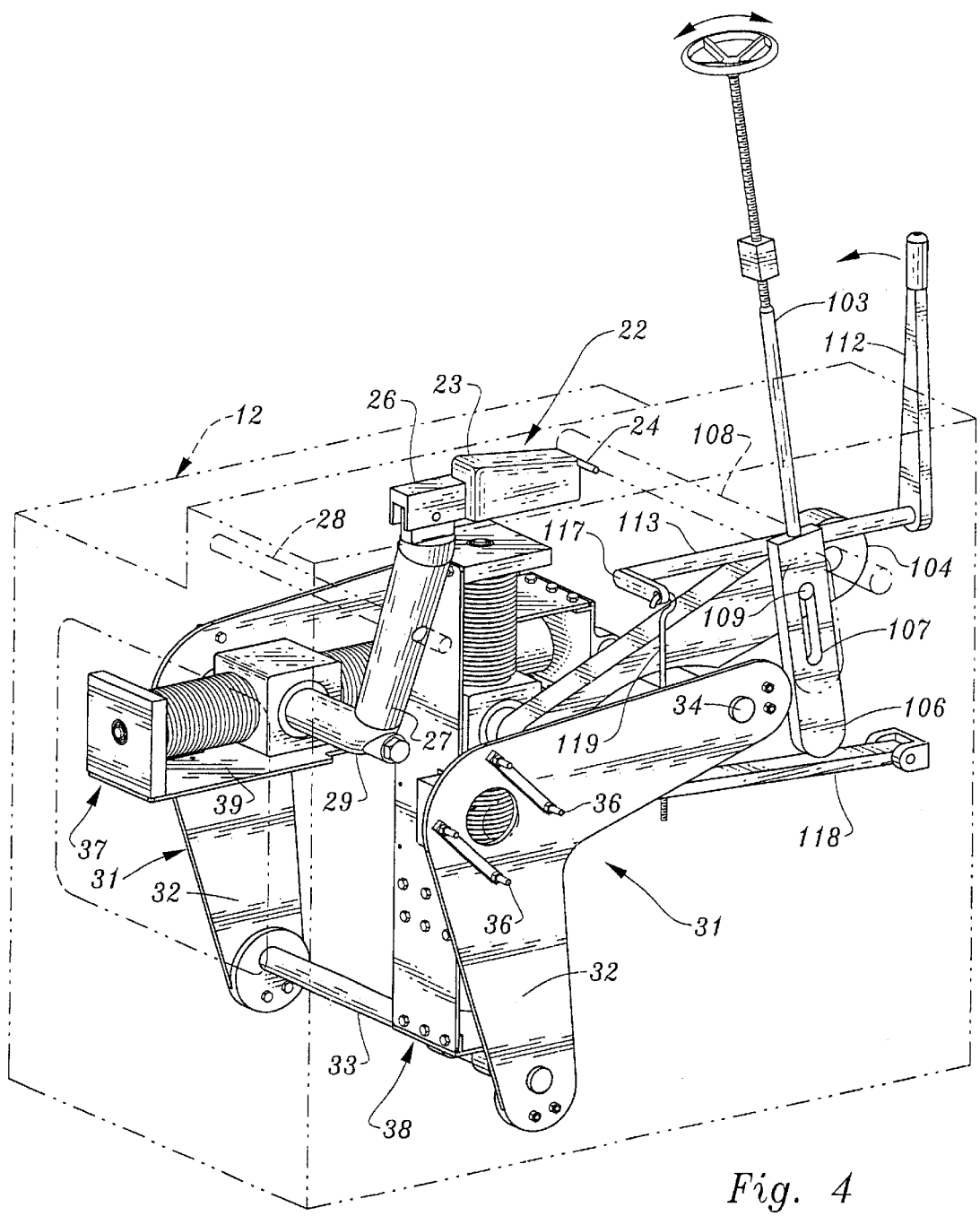
FIG. 4 is a perspective view showing the X and Y axis drivers, respectively connected to the driver arms for the feed mechanism and the grinding head assembly, the general outline of the sharpener frame being shown in broken line.

Turning now to FIG. 1, a saw sharpener apparatus 11 includes a frame 12, for housing and supporting the various components to be described herein. A portion of a band saw 13 is secured within a horizontal saw carriage 14, mounted along a top portion of the frame 12. The primary purpose of the carriage 14 is to help maintain the saw 13 in secure relation during the grinding operation, while allowing the saw to be indexed successively through the sharpener until the sharpening operation is completed. To that end, the carriage includes a horizontal inner recess and an outer vertical wall, that together with the adjacent portion of the frame, define a groove 16 through which the bottom edge of the saw slides. An elongated clamping bar 17, pivotally mounted to the top frame 12, pneumatically clamps the saw 13 against a frame-mounted alignment plate (not shown) during the first portion of the grinding cycle for each tooth. This grinding cycle, including the clamp down of the saw, will be explained in more detail below. The clamping bar includes a rectangular clamping plate 15, translated by a "pancake" pneumatic cylinder 20, to clamp the saw against the alignment plate at the appropriate time during the grinding cycle. The clamping bar 17 is pivotally mounted to the frame so that it can be swung out of the way when the saw is being installed into or removed from the sharpener.

The remaining portion of the saw is supported and maintained horizontally in a generally oval-shaped configuration by four vertical support posts 18 and a back feed unit 19. A slotted guide 21 is included at the top of each post, to hole the saw 13 in slidable relation therein.

The Feed Finger Mechanism

The saw is successively indexed through the sharpener 11 by the cooperative actions of a feed finger mechanism 22 and the previously mentioned back feed unit 19. The feed finger mechanism includes an elongated head 23 fitted at its front end with a transversely extending finger 24. A clevis 26, secured to the rear end of the head, is pivotally attached to a drive arm 27. A fixed rod 28 is journalled through a median portion of the drive arm 27. Lastly, an attachment foot 29, extends from the lower end of arm 27 at an oblique angle.

In a retrofit application of the invention herein, all of the components of the feed finger mechanism 22 described to this point may be left unmodified from the prior art cam-driven arrangement. However, as explained above, for the retrofit modification to proceed, the cam follower of the prior art sharpener must be removed from the end of the attachment foot 29. Also, the remainder of the X and Y axis drive components are removed as well, including the drive motor, the cams, the cam shaft, and the bearings supporting the cam shaft.

In lieu of the removed components, a sub-frame 31 is first installed. Sub-frame 31 includes a pair of parallel end plates 32, spanned by a fixed, lower support shaft 33 and a fixed, upper support shaft 34. Bolts 36 are used to mount the plates 32 to the inner wall of frame 12, using the same holes which were previously used to mount the cam shaft bearings. This particular sub-frame construction makes the retrofit modification of the cam-actuated prior art sharpener a relatively straightforward process. However, it may also be desirable in a particular application not to use the sub-frame arrangement, in which case the support shafts could be individually mounted, directly to the frame. It is also apparent that the housing, or base plate, of the X and Y axis drivers discussed below could be extended to reach an opposing wall of the frame, and be pivotally attached thereto.

The X Axis And Y Axis Drivers

One end of an X axis driver 37 is connected to the upper support shaft 34. The same end of a Y-axis driver 38 is connected to the lower support shaft 33 (see. FIG. 4). Because the X and Y axis drivers are substantially identical in construction, only the structural features of the Y-axis driver 38 will be explained in detail, it being understood that the X-axis driver is structurally identical, except where differences are specifically noted below. In addition, for simplicity and clarity, the same numerals will be used for identifying common components of both drivers, wherever appropriate.

Making specific reference now to FIGS. 13–15, the Y-axis driver 38 includes an elongated, driver frame or plate 39, upon which the major components of the driver are mounted. A pillow block 41, including a journal bearing 42, is secured to one end of the plate 39. In this case, lower shaft 33 is passed through the journal bearing 42 when the Y-axis driver 38 is installed. This mounting arrangement accommodates the slight rotation the drivers make around their support shafts during normal operation.

A servo motor 43 is mounted to a motor plate 44. A first bearing plate 46 is bolted to plate 39 in parallel, spaced relation, from motor plate 44. A second bearing plate 47 is bolted to the other end of plate 39. A ball screw shaft 48 extends between plates 46 and 47, and is mounted for rotation therein by means of respective ball bearings 49 and 51. A coupler 52 interconnects an output shaft of motor 43 with an adjacent end of shaft 48, so that rotary motion of the motor is imparted to the shaft. A cover plate 53 maintains the pillow block 41, the motor plate 44, and the first bearing plate 46 in secure relation.

The ball screw shaft 48 passes through opposing end walls 54 of a reciprocating element, or carrier box, generally identified by the numeral 56. Secured within one of the end walls is a bushing 57. A ball screw nut 58 is fixed within the bushing 57. Balls 59, held captive within nut 58, effect a translation of carrier box 56, in response to rotation of ball screw shaft 48. A plate (removed for clarity, in FIG. 14) normally seals off one open side of carrier box 56. A bearing 60 is mounted within a circular cutout in the other side 62 of the carrier box 56. Bearing 60 is secured therein by means of a snap ring 65. An internally threaded bushing 61, is press-fitted within the bore of the bearing 60. A first bellows 63 extends between an end wall 54 and the first bearing plate 46, covering a first enclosed section of the threaded ball screw shaft. A second bellows 64 extends between the other end wall 54 and the second bearing plate 47, covering a second enclosed section of the threaded ball screw shaft. The bellows 63 and 64 expand and contract in response to movement of the carrier box. The combination of the sealed carrier box and the two bellows is effective to protect the ball screw and the ball nut from airborne contaminants such as metal filings and dust.

A particular advantage of the foregoing arrangement is that all linear guides or rails for the ball nut or its carrier box have been eliminated. In other words, in a conventional ball screw drive assembly, two or more parallel guides are typically used to support the ball nut or its housing as they are driven by the ball screw. In the present construction, the reciprocating carrier box has no external support, so most of the weight of each driver is supported by side loading forces between the ball, the ball screw, and the ball screw nut. By eliminating the need for linear guides, the X and Y axis drivers of the present invention are considerably less expensive to manufacture. Moreover, the difficulty in isolating the linear guides from the dust and metal fragments generated during the sharpening operation is avoided.

A position encoder 66 is mounted on the rear end of servo motor 43, and is mechanically coupled to the motor's drive shaft. The position encoder 66 produces pulses which correspond to the extent and the direction of rotation of the servo motor and the connected ball screw shaft. These pulses are carried over output wires 67 to a computerized controller 68 (see, FIG. 16). In this manner, the controller is able to determine the precise location, and the rate and direction of movement of the carrier box 56.

Controller 68 has a user interface including an LCD screen display 69 and control buttons 71, 72, and 73. A rotary speed control knob 74 is also provided on the front panel of controller 68. Internal components of the controller which are not shown include a microprocessor, programmable memory, servo motor amplifiers, and high current drivers. The drivers control various electric solenoids to be discussed herein.

A micro switch 77 is mounted to a median region of the base plate 39 of Y-axis driver 38. Micro switch 77 includes a lever arm 78, having a tip element 79 adjacent first bearing plate 46. When carrier box 56 of the Y-axis driver is driven to a proximate location, adjacent plate 46, box 56 impinges upon element 79, and a signal confirming that event is sent to controller 68, over micro switch wires 81. The X-axis driver 37 includes a micro switch 82, located at a distal end of its base plate 39, adjacent second bearing plate 47. Switch 82 also includes a lever arm 83 and a tip element 84. The location of micro switch 82 is such that when carrier box 56 of the X-axis driver is driven to a distal location, adjacent plate 47, box 56 contacts element 84, and a signal confirming that event is sent to controller 68, over micro switch wires 86. Controller 68 uses this information regarding the location of the two carrier boxes, to place the feed arm mechanism and the grinding head assembly in a "home" position, during an initialization sequence for the sharpener 11 upon power up.

Electrical power to actuate the servo motor 43 of the X-axis driver is provided by controller 68 over motor wires 87, and electrical power to actuate the servo motor 43 of the Y-axis driver is similarly provided over motor wires 88. Controller 68 supplies current of the proper polarity to drive servo motors 43 either clockwise or counterclockwise, depending upon the phase of the grinding cycle for a tooth, to be described below, resulting in cyclic, reciprocating movement of the respective carrier boxes.

The X-axis driver 37 is interconnected to attachment foot 29 by means of a bolt 89 threaded into bearing 61. As can be seen in FIGS. 10–12, the movement of carrier box 56 toward servomotor 43 causes drive arm 27 to pivot about rod 28, resulting in a rearward movement of feed finger 24. And, the movement of carrier box 56 away from the servomotor 43 causes the drive arm to pivot about the rod 28 in an opposite direction, effecting a forward movement of feed finger 24. The axial orientation of head 23 is slightly offset from that of saw 13, in a forwardly diverging direction. This offset is such that at the beginning of a grinding cycle, feed finger 24 engages a gullet 91 of a tooth 92 (see, FIG. 17A). Later in the cycle, after the tooth and the saw have traveled a certain distance, the feed finger disengages from the gullet (see, FIG. 17H). Then, the servo motor is reversed, and the feed finger is driven rearwardly for a new cycle.

While the above-described reciprocating action results in successive indexing of the saw through the sharpener 11, the back feed unit 19 is also included to drive the other side of the saw in identical fashion. This is necessary so that "bunching" of the saw during the sharpening operation will not occur. Back feed unit includes a back feed arm 93 and a back feed finger 94 (see, FIGS. 1 and 16). Back feed arm 93 is pivotally mounted at one end, where it is driven in reciprocating fashion by a double action pneumatic cylinder (not shown). Pneumatic pressure is provided by an air compressor or pump 96. The pressurized air is diverted to directional ports on the pneumatic cylinder by an electric solenoid (not shown). The electric solenoid is actuated by controller 68 through back feed solenoid wire 97. When back feed finger 94 is driven forwardly in synchronism with forward action of feed finger 24, it pushes against the gullet of the saw tooth and drives the saw in a forward direction. When back feed finger 94 is retracted rearwardly, the finger rides up the back of the next tooth, and then drops into its gullet. Then, the cycle is repeated, so that the entire extent of the saw is indexed identically, during the sharpening operation.

A portion of the output of pump 96 is also feed to an electric solenoid (not shown) within clamping bar 17. A solenoid wire 100 from the controller 68 carries control signals for selective actuation of the solenoid during a portion of the grinding cycle. When actuated, the solenoid provides pressurized air to cylinder 20, effectively clamping saw 13 in place.

The Grinding Head Assembly

Having explained the mechanisms which effect the indexing of the saw, we can now turn to a description of the saw grinding components. A grinding head assembly 98, of conventional design, includes an arbor carriage 99, an arbor 101, and a grinding wheel 102 (see, FIG. 6). The arbor carriage 99 is pivotally mounted at a lower end to the frame, so that the upper end may be raised and lowered about the pivot point. It is during successive raising and lowering of the grinding head assembly 98, that the grinding wheel 102 shapes each saw tooth.

To that end, the grinding head assembly 98 further includes a lifting rod 103 and a drive arm 104. An upper threaded end of the lifting rod 103 is adjustable in length, and is adapted to support arbor carriage 99. A lower end of the lifting rod includes a drive head 106, having an elongated slot 107 therein. Drive arm 104 is pivotally mounted at one end, through a shaft 108. A drive pin 109 extends outwardly from arm 104, to engage slot 107 in slidable relation. When arm 104 is raised to pivot about shaft 108, drive pin 109 also raises, pushing against the upper end of slot 107. The lifting rod 103 and the arbor carriage 99 are thereby lifted upwardly as well (see, FIG. 7). When drive arm 104 is pivoted into a lowered position, gravity draws the carriage and the lifting rod downwardly, under the support and control of the drive pin 109 (see, FIG. 6).

In the cam-actuated prior art sharpener, the lower end of drive arm 104 was bolted to a cam follower, which in turn, engaged a cam. In making the retrofit modification of this prior art device, the cam follower and cam are removed, as discussed above. In lieu thereof, Y-axis driver 38 is installed onto lower shaft 33. All that remains to complete the modification, is to attach the lower end of the drive arm 104 to the reciprocating carrier box 56, by means of bolt 111. In this manner, the head grinding assembly 98 is now driven upwardly and lowered downwardly by the Y-axis driver 38 of the present invention, so that the grinding wheel 102 can shape the saw teeth in the desired fashion.

The Grinding Head Lifting/Disabling Mechanism

During adjustments of the sharpener, and to observe the operation of certain of its components in isolation, the need arises to disable the drive of the grinding head assembly. A simple yet effective mechanism has been developed to provide this feature. Making particular reference now to FIGS. 7–9, inclusive, a lifting bar 112 will be noted. Lifting bar 112 is located outside frame 12, for convenient access by the machine operator. One end of the bar 112 is attached to an outer end of a rotatable shaft 113. The other end of bar 112 is provided with a grip 114. A bracket 116, extending from frame 12, supports an inner end of shaft 113 for rotation. An intermediate portion of shaft 113 passes through the frame 12. A lever arm 117 is attached at its proximate end to the inner end of shaft 113. A lifting plate 118 is hingeably attached at one end to frame 12. The other end of plate 118 includes a hole through which a lower end of a threaded connecting rod 119 passes. An upper end of connecting rod 119 has a hook, which passes through a hole at the distal end of lever arm 117. A nut 121 is provided on the threaded portion of rod 119, so that the relative position of plate 118 can be adjusted for proper operation of the mechanism for disabling the grinding head assembly.

During normal operation of the sharpener, lifting bar 112 is in a vertical position, as shown in FIG. 4. This position of the bar 112 maintains a slight gap between the lower end of the drive head 106 and the upper surface of the lifting plate 118, even when the grinding head assembly is fully lowered (see, FIG. 6). This gap is increased, of course, when the assembly 98 is fully raised (see, FIG. 7). When the operator desires to disable the grinding head assembly, so that grinding wheel 102 cannot come into contact with saw 13, lifting bar 112 is rotated downwardly, as shown in FIG. 8. This rotates shaft 113 and lever arm 117, lifting both rod 119 and plate 118. The upper surface of plate 118 impinges upon the lower end of drive head 106, raising the grinding head assembly 98 into a disabled position (see, FIG. 9). In this disabled position, drive pin 109 continues to move within slot 107, but the pin does not come into contact with the upper end of the slot. Consequently, all systems of the sharpener continue to operate, except the grinding head assembly does not raise and lower during each grinding cycle. Thus, the saw will still be indexed through the sharpener 11, allowing observation of the sharpener's operation without concern for damaging the saw if adjustments are needed. This mechanism also provides a safety feature by raising the grinding wheel away from the grinding area during an emergency.

The Computerized Controller And Its Software

Before an actual grinding cycle is described, a detailed description of the operational modes and features of the computerized controller 68 will be presented. The main program of the software for the controller 68 is the motion control program. This program controls the movement of the head grinding assembly and the feed finger mechanism by powering and monitoring the positions of the servo motors in the X-axis and Y-axis drivers. The main program also operates electric solenoids which control air pressure directed to the saw clamping mechanism as well as the air pressure driving the back feed unit. The software also employs two prioritized multi-tasking sub-programs. The first priority program is the user input handler, which constantly monitors the push buttons 71–73, for an input from the machine operator. The second priority program is the message handler. This program runs at all times in the background, and displays messages sent to it by either of the programs on display screen 69.

On power up, execution of the main program beings. Initialization of program variables and flags is performed, followed by initiation of the two sub-programs and the display of a "welcome" message. Next, the display shows a HOMING message, the pushbuttons become operative, and the grinder motions commence.

Motion Control Algorithms

All motions performed by the X and Y axis drivers are closed loop. When a servo control signal is sent from the controller to the servo amplifier and its respective servo motor 43, the position change due to this signal is reflected in a corresponding signal sent from the position encoder 66 to controller 68. All motion is controlled using a Proportional, Integral Derivative ("PID") filtering technique. The terms P. I. and D refer respectively to empirically determined constants used in the Proportional gain function (larger correction for larger error), the Integrator function (improves accuracy), and the Derivative function (damping) of the PID filter. The PID values are chosen so that the desired speed or position is reached as quickly as is physically possible, while concurrently meeting the level of stability and accuracy desired.

For any motion, the error between the desired position or speed and the actual position or speed is computed. This error is then digitally processed by the PID filter. The result is the new control signal for the servo motor. This cycle of checking the error and modifying the existing control signal is repeated thousands of time per second, with the ideal goal of having the actual motion match the desired motion.

The most basic motion undertaken by the X and Y axis drivers is the rotation of the ball screw shaft 48 at a predetermined rate. This rate, in turn, determines a corresponding known rate of linear motion of the ball screw nut 58, because the pitch of the ball screw is known. The software of the controller 68 first determines the current speed of rotation by counting pulses from the servo motor encoder for a known period of time. The rotational speed, in revolutions per minute, is then calculated by division, since the number of pulses per revolution is known. The current speed is subtracted from the desired speed, with the resultant error, if any, being filtered by the PID filter. The output of the PID filter is the next value the controller sends to the servo motor amplifier. This reiterative process occurs thousands of times per second as the software attempts to make the error zero.

Another type of motion undertaken is the movement of the ball screw nut 58 to a specific position at a desired velocity, or movement to a specific position within a given length of time. This is accomplished essentially in the same manner as just described, for setting the rotational speed of the ball screw. Thus, a rapidly as possible, the error between the desired and the actual velocity or position is calculated, filtered, and fed back to the servo motor amplifier as the next control signal. However, the number of calculations that must be rapidly performed increases, as the number of different target variables, such as location, velocity, or elapsed time, increases.

The most computation intensive operation undertaken by the software is the coordinated vector movement. To accomplish this type of movement, additional calculations are performed to coordinate the motion of the two ball screw nuts in the X and Y axis drivers. Since the mechanical mechanism converts the ball screw nut motions into X axis motion of the saw blade and Y axis motion of the grinding wheel, any saw tooth shape desired can be generated. In addition, computations are performed to control the speed of grinding along the selected shape. The two vector movements used to describe all saw tooth shapes are the line and the arc.

The Homing Operation

The homing operation allows the computerized controller 68 to establish a known mechanical position on each axis from which to base all future moves of the ball screw nuts. Each axis driver has a micro switch mounted at a particular extreme limit of ball screw nut motion, for that driver. On power up, the controller first checks each micro switch for closure, checking for confirmation that the ball screw is already at the extreme position. If the ball screw is not at that position, the controller moves the ball screw nut toward the micro switch until switch closure is detected.

Then, the ball screw nut motion is reversed until the encoder 66 on the servo motor outputs an index pulse. The index pulse is a once per revolution pulse that the encoder produces in addition to a 4000 pulses per revolution output signal. Once the controller has received this index pulse, the controller will count all subsequent encoder pulses, using the index pulse as a reference for zero. This homing operation is performed for both axes, and when completed, the state of the sharpener changes to Ready, and this fact is shown on the display screen 69. The main program halts, and waits for input from the machine operator.

The Indexing Operation

Before grinding of a variable-pitch or variable-depth saw can commence, the feed finger 24 must be positioned on an index tooth, having a distinctive physical characteristic. This ensures that the grinding operations will be proper for the different pitches or the different gullet depths found on the saw. When this operation is initiated, the controller automatically moves the feed finger 24 to a predetermined index position. Then, the operator examines the saw for the distinctive physical characteristic. One such characteristic might be the longest tooth, or the tooth having the deepest gullet. Having located that tooth, the operator manually moves the saw so that the feed finger is in the gullet of the index tooth. The saw and the controller are now in synchronization, and the grinding operation can begin. It should also be noted than an automatic index tooth detection system, for example, optical or mechanical sensors, may be used to identify the index tooth. In this case, the controller 68 could perform the indexing procedure automatically.

The Grinding Operation

After an input signal to commence grinding has been received, the software checks which tooth profile the machine operator has set to be current. Then, the software accesses the appropriate subroutine, and grinding of the first tooth begins. The grinding of each tooth is made in accordance with a subroutine, called in the order determined by the main program. Each tooth shape is defined and stored as a sequence of lines and arcs, stored as their start point, end point, and radius. The point 0.0 was previously defined during the homing operation. Consequently, all subsequent vector movements are defined relative to the 0,0 position, and are determined in units corresponding to encoder counts. Each tooth subroutine also contains commands to turn the pneumatic saw clamp cylinder 20 on and off at the appropriate time, and to actuate the remote back feed unit 19 in a manner appropriate for the pitch of the particular tooth. The controller follows the subroutine instructions using the PID filter method described above.

The speed of the grinding operation is set by the operator turning the adjusting knob 74 on the front panel of controller 68. The resistance of a potentiometer, mechanically linked to knob 74, is read by the user input subprogram. The overall speed of the sharpener is set by this subprogram, and passed to the main program. However, the overall speed is further modified, as necessary, for some portions of the X and Y axis motion sequence, to obtain the desired grinding speed at all points on a given tooth shape.

Upon completion of the subroutine for the first tooth, the main program calls for the next and subsequent subroutines to grind additional teeth, in accordance with the desired profiles. Thus, it is possible to grind each of the teeth identically, or to grind sets of teeth in particular and different ways in a sequence, which may be repeated for the entire extent of the saw. The controller also has a retip mode, which directs each tooth subroutine to use slower grinding speeds over the tip of each tooth.

Illustration Of A Grinding Cycle For One Tooth

Figure 17A:
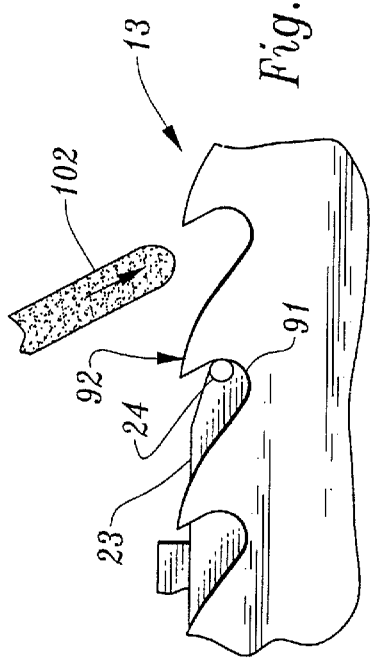
FIGS. 17A–17L, inclusive, are successive side elevational views of a saw showing the feed finger of the saw feed mechanism and the grinding wheel of the grinding head assembly, the Figures collectively depicting a complete grinding cycle for a saw tooth using the sharpener of the present invention.
Figure 17B:
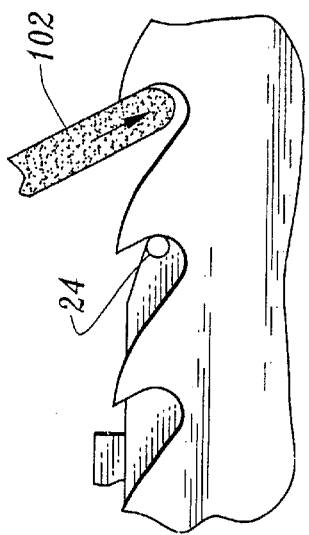
Figure 17C:
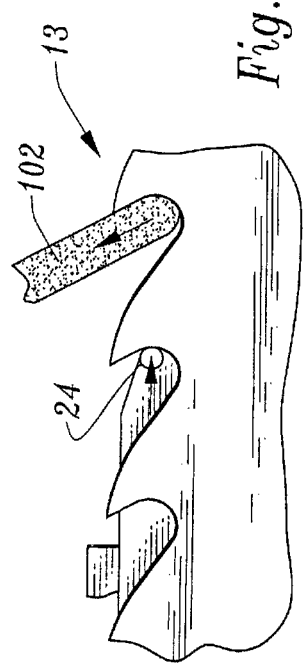
Figure 17D:
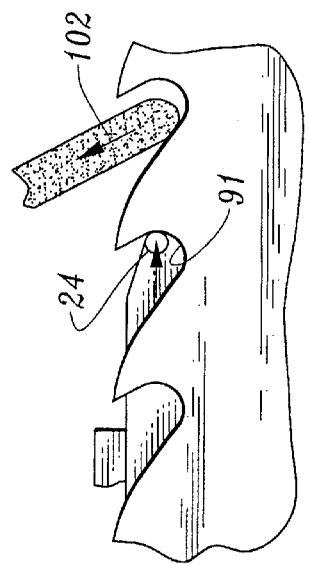
Figure 17E:
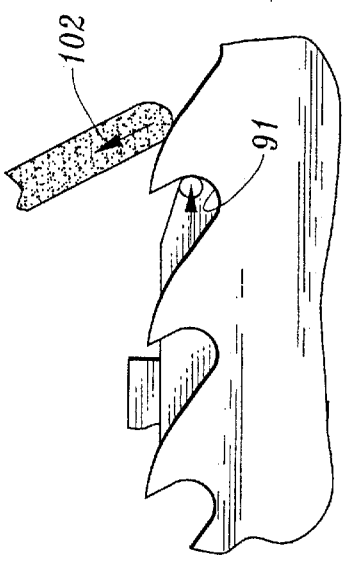
Figure 17F:
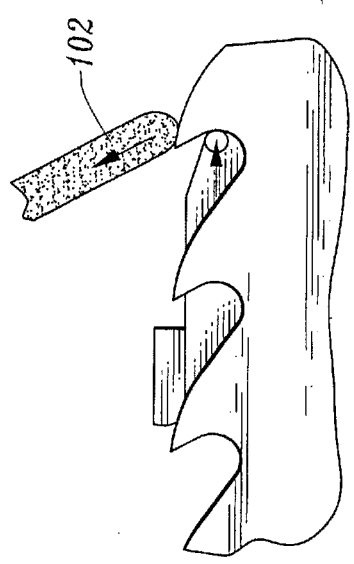
Figure 17G:
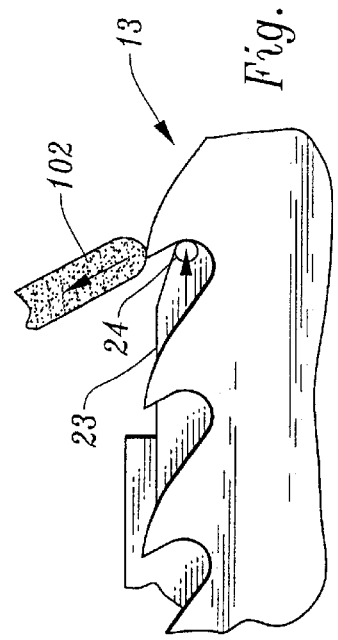
Figure 17H:
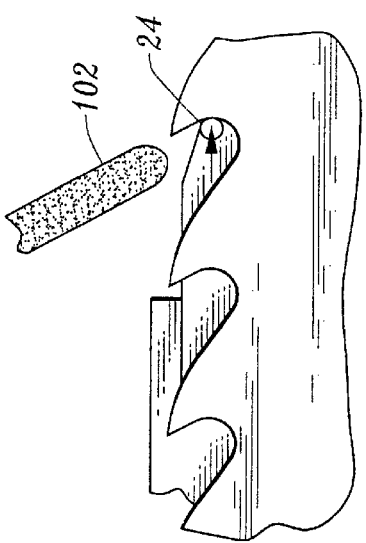
Figure 17I:
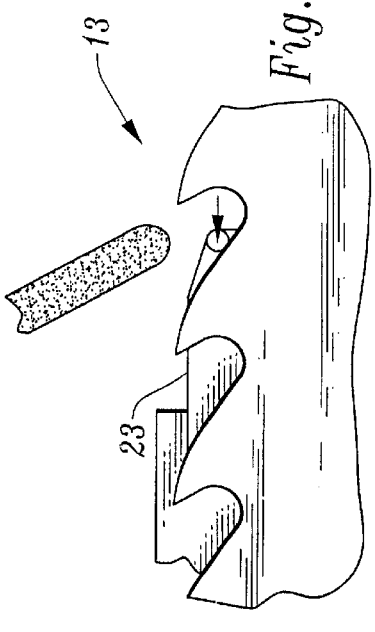
Figure 17J:
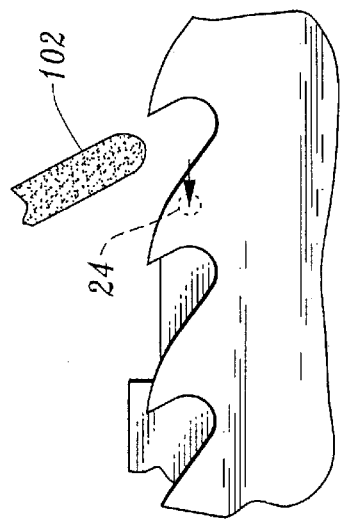
Figure 17K:
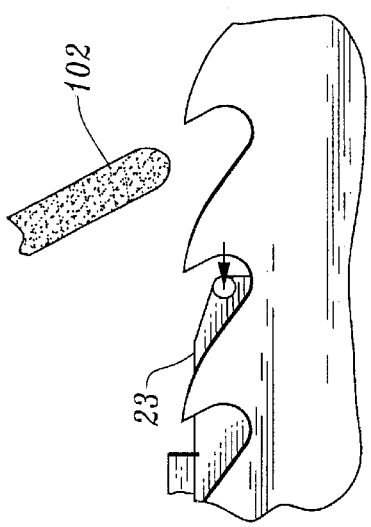
Figure 17L:
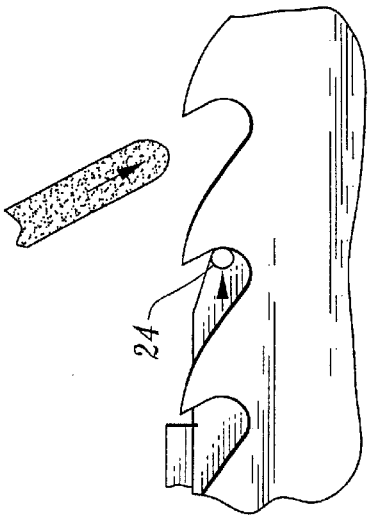

Turning now to FIGS. 17A through 17L, inclusive, a complete grinding cycle for one tooth is shown. In FIG. 17A, the cycle is initiated with grinding wheel 102 beginning its angular descent from a fully raised position. At this point in the cycle, the feed finger 24 is stationary. The controller 68 sends a signal to an electric solenoid, providing pressurized air to pneumatic cylinder 20. This effectively clamps saw 13 securely in place, in preparation for the next step. As grinding wheel 102 continues to descend, it enters the upper portion of the gullet 91 (see, FIG. 17B). Because the saw is clamped, it will not be shifted by any forces created during this phase of the grinding operation. As shown in FIG. 17C, when the grinding wheel reaches the bottom of the gullet, the feed finger 24 begins applying X axis forces to the saw. Concurrently, the controller deactivates the solenoid, and the cylinder releases its clamping force on the saw. The grinding wheel also begins an upward movement, as the back side of the tooth 92 is formed. In FIGS. 17D–17G, the grinding operation continues in identical fashion, until the tip of the tooth 92 is reached. It can be seen that in FIG. 17H, the grinding wheel 102 has now cleared the tip of the tooth, as feed finger 24 reaches the greatest extent of its forward movement. In FIG. 17I, the feed finger 24 has begun its rearward movement, which continues in FIGS. 17J and 17K. Lastly, to complete the cycle, the tooth is urged slightly forwardly in FIG. 17L, so it is in contingent relation with the upper portion of the gullet, as the grinding wheel 102 begins is next descent.

As described above, the saw sharpener 11 of the present invention may be used advantageously both as a retrofit modification to prior art saw sharpeners, and in newly constructed saw sharpeners. It is evident that the specific construction of the X-axis and Y-axis drivers may need to be modified considerably for the particular application at hand. For example, the direct drive between the servo motor shaft and the ball screw shaft could be modified through the use of belts and gears so the axes of the two components could be offset in parallel relation, or perpendicular. Such an arrangement may be necessary or desirable to shorten the overall length of the drivers, or to provide different configurations for the drivers. In lieu of the preferred servo motor, an electro-hydraulic drive may be substituted. Such a drive would include a reversible hydraulic drive motor, and electrical systems for determining the direction and amount of hydraulic flow and the position of the carrier box.

It is also evident that the drivers may be relocated, in a newly constructed sharpener. Rather than being below, housed within the frame of the sharpener, one or more of the drivers may be located above or on the side of the frame. It is also contemplated that the teachings of the present invention may be applied with similar improved results to sharpeners for other types of saws, such as gang saw sharpeners or circular saw sharpeners.

It will be appreciated, then, that we have disclosed herein an computer-controlled band saw sharpener, which has applications both as a retrofit to improve the performance of prior art sharpeners, and as part of a newly constructed sharpener, and that the teachings may be applied for use with other sharpeners for other types of saws.

What is claimed is:

1. An electro-mechanical driver and saw sharpener, comprising:
   a. a driver frame;
   b. a motor mounted on said frame, said motor having a rotary output shaft;
   c. a ball screw mounted for rotation on said frame, said ball screw having a threaded portion;
   d. a coupler between said output shaft and one end of said ball screw;
   e. a ball nut mounted on said threaded portion, said ball nut having internal threads and further including a plurality of balls captive between said internal threads and said threaded portion;
   f. a carrier box, said ball nut being secured within and fixed to said carrier box;
   g. means for interconnecting the carrier box either to a feed finger mechanism or to a grinding head assembly of the saw sharpener;
   h. a position encoder connected to said motor output shaft; and,
   i. computer means responsive to an output of said position encoder and interconnected to said motor, for selectively moving either the feed finger mechanism forwardly and rearwardly through an X-axis, or the grinding head assembly downwardly and upwardly through a Y-axis.

2. A driver as in claim 1 in which said motor is a servo motor.

3. A driver as in claim 1 in which a bellows is provided around said threaded portion of said ball screw.

4. A driver as in claim 1 further including a micro switch mounted on said driver frame, said micro switch providing an output when said carrier box reaches a homing position.

5. An electro-mechanical driver for providing a reciprocating drive force, comprising:
   a. driver frame;
   b. a servo motor mounted on said frame, said motor having a rotary output shaft;
   c. a ball screw, said ball screw having one end attached to said rotary shaft and the other end mounted for rotation on said driver frame, said ball screw further having a threaded portion between said one end and said other end;
   d. a ball nut mounted on said threaded portion, said ball nut having internal threads and further including a plurality of balls captive between said internal threads and said threaded portion;
   e. a carrier box, said ball nut being secured within and fixed to said carrier box;
   f. a drive arm connected to said carrier box;
   g. computer means interconnected to said motor, for selectively actuating said motor for rotation first in one rotational direction and then in another rotational direction, thereby moving said carrier box in reciprocating fashion; and,
   h. a position encoder connected to said motor rotary output shaft, said position encoder providing an output to said computer means corresponding to an extent, rate, and a direction of rotation for said servo motor.

6. A driver as in claim 5 in which said computer means is programmed selectively to actuate said motor for a predetermined extent, rate, and direction of rotation.

7. An electro-mechanical driver for providing a reciprocating drive force, comprising:
   a. driver frame;
   b. a servo motor mounted on said frame, said servo motor having a rotary output shaft;
   c. a ball screw, said ball screw having one end attached to said rotary shaft and the other end mounted for rotation on said driver frame, said ball screw further having a threaded portion between said one end and said other end;
   d. a ball nut mounted on said threaded portion, said ball nut having internal threads and further including a plurality of balls captive between said internal threads and said threaded portion;
   e. a carrier box, said ball nut being secured within and fixed to said carrier box;
   f. a drive arm connected to said carrier box;
   g. a position encoder connected to said motor rotary output shaft, said position encoder providing an output corresponding to rotation of said servo motor; and,
   h. computer means interconnected to said motor and to said output of said position encoder, for selectively actuating said motor for rotation in a first rotational direction and then in a second rotational direction, thereby moving said carrier box in reciprocating fashion.

8. A driver as in claim 7 in which said computer means is programmed selectively to actuate said motor for a predetermined extent, rate, and direction.

9. A driver as in claim 7 in which a bellows is provided around said threaded portion of said ball screw.

10. A driver as in claim 7 in which a first bellows extends from one end wall of said carrier box, said first bellows covering a first enclosed section of said threaded portion of said ball screw, and in which a second bellows extends from the other end wall of said carrier box, said second bellows covering a second enclosed section of said threaded portion of said ball screw.

11. A driver as in claim 7 further including a micro switch mounted on said driver frame, said micro switch providing an output to said computer means when said carrier box reaches a homing position.

12. An electro-mechanical driver for providing a reciprocating drive force, comprising:
   a. driver frame;
   b. a motor mounted on said frame, said motor having a rotary output shaft;
   c. a ball screw, said ball screw having one end attached to said rotary shaft and the other end mounted for rotation on said driver frame, said ball screw further having a threaded portion between said one end and said other end;
   d. a ball nut mounted on said threaded portion, said ball nut having internal threads and further including a plurality of balls captive between said internal threads and said threaded portion;
   e. a carrier box, said ball nut being secured within and fixed to said carrier box;
   f. a first bellows extending from one end wall of said carrier box covering a first enclosed section of said threaded portion of said ball screw, and a second bellows extending between the other end wall of said carrier box covering a second enclosed section of said threaded portion of said ball screw;

g. a drive arm connected to said carrier box; and, h. computer means interconnected to said motor, for selectively actuating said motor for rotation first in one rotational direction and then in another rotational direction, thereby moving said carrier box in reciprocating fashion.

13. An electro-mechanical driver for providing a reciprocating drive force, comprising:

a. driver frame;

b. a motor mounted on said frame, said motor having a rotary output shaft;

c. a ball screw, said ball screw having one end attached to said rotary shaft and the other end mounted for rotation on said driver frame, said ball screw further having a threaded portion between said one end and said other end;

d. a ball nut mounted on said threaded portion, said ball nut having internal threads and further including a plurality of balls captive between said internal threads and said threaded portion;

e. a carrier box, said ball nut being secured within and fixed to said carrier box;

f. a drive arm connected to said carrier box;

g. computer means interconnected to said motor, for selectively actuating said motor for rotation first in one rotational direction and then in another rotational direction, thereby moving said carrier box in reciprocating fashion; and, h. a micro switch mounted on said driver frame, said micro switch providing an output to said computer means when said carrier box reaches a homing position.

* * * * *